United States Patent
Yoon et al.

(10) Patent No.: US 8,824,775 B2
(45) Date of Patent: Sep. 2, 2014

(54) ROBOT AND CONTROL METHOD THEREOF

(75) Inventors: Suk June Yoon, Seoul (KR); Kyung Shik Roh, Seongnam-si (KR); Woong Kwon, Seongnam-si (KR); Seung Yong Hyung, Yongin-si (KR); Hyun Kyu Kim, Seoul (KR); Sung Hwan Ahn, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 403 days.

(21) Appl. No.: 12/654,160

(22) Filed: Dec. 11, 2009

(65) Prior Publication Data

US 2010/0172571 A1    Jul. 8, 2010

(30) Foreign Application Priority Data

Jan. 6, 2009 (KR) ......................... 10-2009-0000891

(51) Int. Cl.
*G06K 9/00* (2006.01)
(52) U.S. Cl.
USPC ........................... 382/153; 382/154; 700/245
(58) Field of Classification Search
CPC ................................................. G06K 9/00664
USPC ............... 382/153, 154; 901/47, 50; 700/245, 700/259; 701/28
See application file for complete search history.

(56) References Cited

U.S. PATENT DOCUMENTS

| | | | | |
|---|---|---|---|---|
| 6,134,340 A * | 10/2000 | Hsu et al. | ...................... | 382/124 |
| 7,573,403 B2 * | 8/2009 | Goncalves et al. | ........ | 340/995.1 |
| 7,650,013 B2 * | 1/2010 | Dietsch et al. | ................ | 382/103 |
| 7,706,602 B2 * | 4/2010 | Nakashima | .................... | 382/154 |
| 7,831,098 B2 * | 11/2010 | Melikian | ........................ | 382/215 |
| 8,010,232 B2 * | 8/2011 | Nakajima et al. | ............. | 700/259 |
| 8,073,200 B2 * | 12/2011 | Oi et al. | ........................ | 382/103 |
| 8,437,536 B2 * | 5/2013 | Saito | ............................. | 382/154 |
| 2001/0041077 A1 * | 11/2001 | Lehner et al. | ................. | 396/661 |
| 2005/0089213 A1 * | 4/2005 | Geng | ............................. | 382/154 |
| 2006/0293810 A1 * | 12/2006 | Nakamoto | ....................... | 701/28 |
| 2008/0215184 A1 * | 9/2008 | Choi et al. | .................... | 700/259 |

(Continued)

FOREIGN PATENT DOCUMENTS

KR    10-2003-0040701    5/2003
KR    10-2004-0094230    11/2004

OTHER PUBLICATIONS

Paul J. Best et al., "A Method for Registration of 3-D Shapes", IEEE Transactions on Pattern Analysis and Machine Intelligence, vol. 14, No. 2, Feb. 1992.

(Continued)

*Primary Examiner* — Gregory M Desire
(74) *Attorney, Agent, or Firm* — Staas & Halsey LLP

(57) ABSTRACT

Disclosed herein are a feature point used to localize an image-based robot and build a map of the robot and a method of extracting and matching an image patch of a three-dimensional (3D) image, which is used as the feature point. It is possible to extract the image patch converted into the reference image using the position information of the robot and the 3D position information of the feature point. Also, it is possible to obtain the 3D surface information with the brightness values of the image patches to obtain the match value with the minimum error by a 3D surface matching method of matching the 3D surface information of the image patches converted into the reference image through the ICP algorithm.

14 Claims, 5 Drawing Sheets

(56) References Cited

U.S. PATENT DOCUMENTS

| | | | |
|---|---|---|---|
| 2009/0118864 A1* | 5/2009 | Eldridge et al. | 700/259 |
| 2009/0208094 A1* | 8/2009 | Hattori et al. | 382/153 |
| 2010/0049367 A1* | 2/2010 | Yang | 700/259 |
| 2010/0119146 A1* | 5/2010 | Inazumi | 382/153 |
| 2010/0172571 A1* | 7/2010 | Yoon et al. | 382/153 |

OTHER PUBLICATIONS

Berthold K.P. Horn, "Closed-form solution of absolute orientation using unit quaternions", Journal of the Optical Society of America A, vol. 4, pp. 629-642, Apr. 1987.

* cited by examiner

ROBOT AND CONTROL METHOD THEREOF

CROSS-REFERENCE TO RELATED APPLICATIONS

This application claims the benefit of Korean Patent Application No. 2009-0000891, filed on Jan. 6, 2009 in the Korean Intellectual Property Office, the disclosure of which is incorporated herein by reference.

BACKGROUND

1. Field

The present invention relates to a feature point used to localize an image-based robot and build a map of the robot, and, more particularly, to a method of extracting and matching an image patch of a three-dimensional (3D) image, which is used as the feature point.

2. Description of the Related Art

Generally, a robot is a mechanism to perform a motion resembling an action of a human being using an electrical or magnetic operation. Recent robots have been utilized in various applications due to the development of sensors and controllers. For example, a robot can be used for housework, public service, or a conveying robot or worker-assisting robot on a production line. For the robot to move under its own self-control, it is necessary to simultaneously perform a localization process to recognize its position without preliminary information on a peripheral environment and a map building process to build a map from the information on the environment. This overall process is called simultaneous localization and map-building (SLAM).

The SLAM is a technology to acquire an image through an all-direction view camera, build a map in real time, and recognize a position. The SLAM is used as an appropriate substitute for indoor localization. However, the SLAM finds a feature point from the acquired image and extracts an image patch having several pixels around the feature point, i.e., extracts an image patch of a 3D image with a predetermined size (15×15 pixels) only from the image itself. For this reason, when a spatial relationship between the camera and the feature point (3D position) changes due to the movement of the camera, the size and direction of the feature point in the image change, with the result that several errors are included in the position of the robot. Thus, it is not possible to accurately localize the robot and build a map of the robot.

SUMMARY

Therefore, it is an aspect of the invention to provide a method of extracting and matching an image patch of an image, using position information of an image-based robot and 3D position information of a feature point, to localize the robot and build a map of the robot.

Additional aspects and/or advantages will be set forth in part in the description which follows and, in part, will be apparent from the description, or may be learned by practice of the invention.

The foregoing and/or other aspects of the present invention are achieved by providing a control method of a robot, including acquiring a 3D image of an environment where the robot moves, extracting a feature point from the acquired 3D image and converting a plane including the extracted feature point into a reference image, and extracting image patches from the reference image and matching the image patches.

The converting the plane including the feature point into the reference image may include converting the plane including the feature point into a reference distance to acquire an image corresponding to the reference distance.

The extracting the image patches from the reference image may include obtaining a conversion matrix with the reference image to extract predetermined pixel-unit image patches from the reference distance.

The matching the image patches may include obtaining 3D surface information using brightness values of the image patches and matching the 3D surface information three-dimensionally using an iterative closest point (ICP) algorithm.

The control method may further include determining whether the brightness values of the 3D surface information satisfies a predetermined reference value, and, when it is determined that the brightness values of the 3D surface information satisfies the predetermined reference value, the 3D surface information may be matched by the ICP algorithm.

The foregoing and/or other aspects of the present invention may also be achieved by providing a control method of a robot, including acquiring a 3D image of an environment where the robot moves, extracting a feature point from the acquired 3D image and converting the extracted feature point into a reference distance, extracting an image patch of an image corresponding to the reference distance, obtaining 3D surface information using a brightness value of the image patch, and matching the 3D surface information three-dimensionally using an ICP algorithm.

The extracting the image patch of the image corresponding to the reference distance may include obtaining a conversion matrix with the image corresponding to the reference distance and extracting predetermined pixel-unit image patches from the reference distance.

The foregoing and/or other aspects of the present invention may also be achieved by providing a robot including an image acquisition unit to acquire a 3D image of an environment where the robot moves and a control unit to extract a feature point from the acquired 3D image and convert a plane including the feature point into a reference image and to extract image patches from the reference image and match the image patches.

The control unit may convert the plane including the feature point into a reference distance, acquire an image corresponding to the reference distance, and convert the acquired image into the reference image.

The control unit may obtain a conversion matrix with the reference image to extract predetermined pixel-unit image patches from the reference distance.

The control unit may obtain 3D surface information using brightness values of the image patches, and match the 3D surface information three-dimensionally using an ICP algorithm.

The control unit may determine whether the brightness values of the 3D surface information satisfies a predetermined reference value, and, when it is determined that the brightness values of the 3D surface information satisfies the predetermined reference value, match the 3D surface information using the ICP algorithm.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
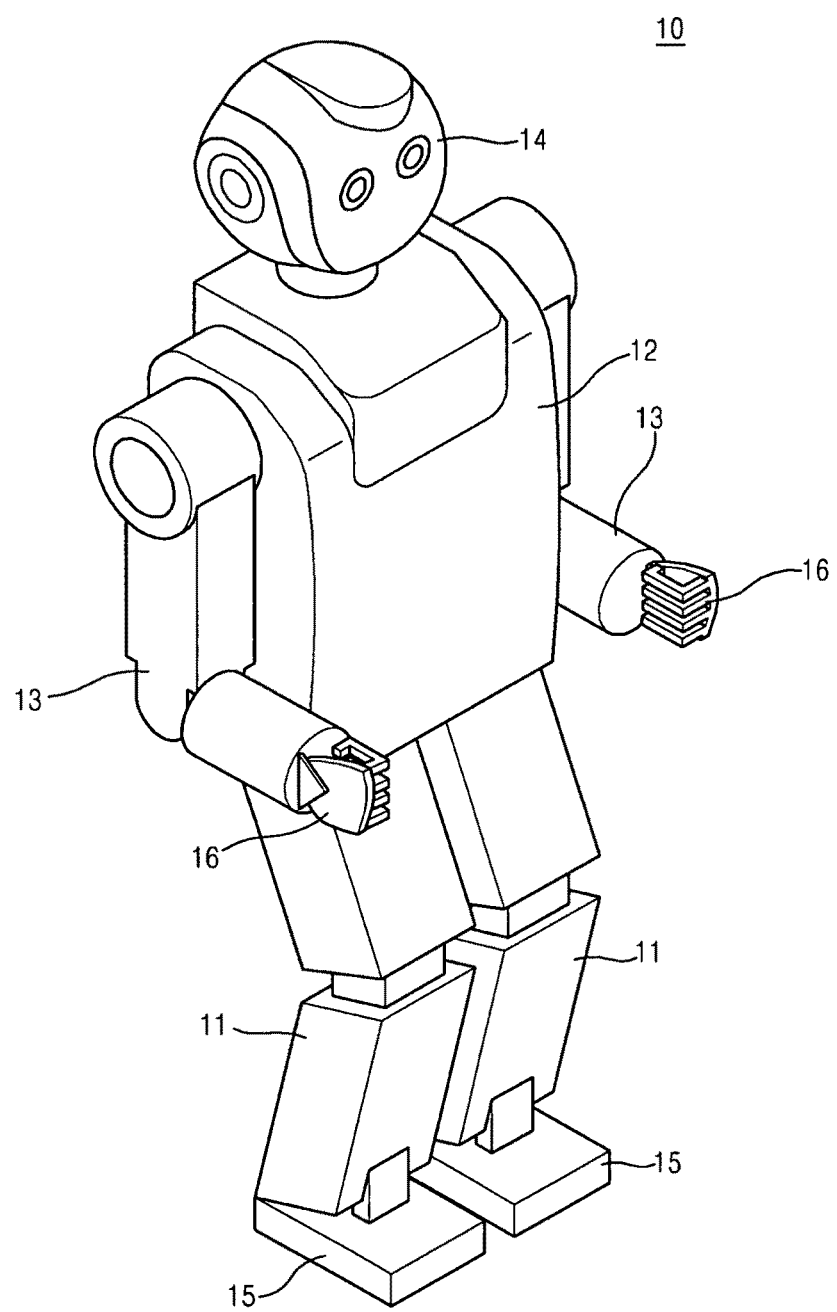
FIG. 1 is a perspective view illustrating the external appearance of a robot according to an embodiment of the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

FIG. 1 is a perspective view illustrating the external appearance of a robot 10 according to an embodiment of the present invention.

In FIG. 1, the robot 10 is a two-leg walking robot that moves in an upright posture using two legs 11 in the same manner as a human being. The robot 10 includes a body 12, two arms 13 mounted to opposite lateral sides of the body 12, and a head 14 mounted to the top of the body 12. Feet 15 and hands 16 are mounted to the legs 11 and the arms 13, respectively. The robot 10 moves self-controllably in an unknown environment.

Figure 2:
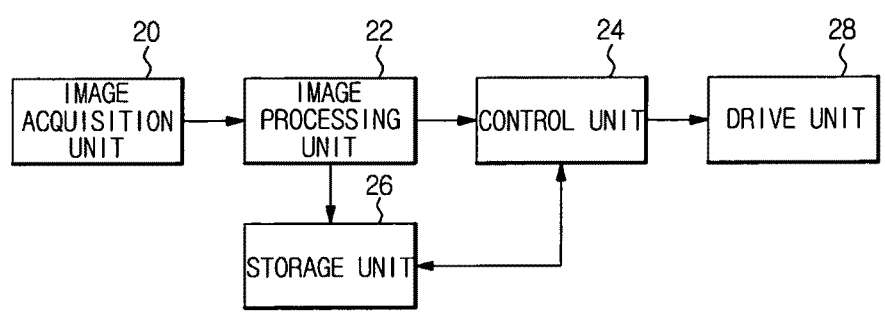
FIG. 2 is a control block diagram of the robot according to the embodiment of the present invention.

FIG. 2 is a control block diagram of the robot according to the embodiment of the present invention. The robot includes an image acquisition unit 20, an image processing unit 22, a control unit 24, a storage unit 26, and a drive unit 28.

The image acquisition unit 20 may be implemented by a 3D measurement device (for example, a stereo camera or a time-of-flight camera) which photographs an image on a movement path of the robot 10, when the robot 10 moves in an unknown environment, to acquire 3D information of various objects (for example, static objects or dynamic objects such as walls or obstacles) located on the path in real time. The 3D measurement device measures distance information of an object detected by a sensor and pixels of the camera as well as image information on each pixel of the camera, which may be utilized as much more information in SLAM or an obstacle detection method.

When the 3D information of the image acquired by the image acquisition unit 20 is inputted, the image processing unit 22 extracts a feature point of the movement path of the robot 10. The feature point is a quantitative point which is not changed depending upon time and a viewing angle when the point is selected in an environment where the robot 10 moves. In a normal image, a point which is not changed even when viewed at any angle is found using a corner image or an image patch. In this embodiment, a plane including a feature point is converted into a reference image, using the image acquisition unit 20, which is the 3D measurement device, to extract the feature point.

When feature points extracted by the image processing unit 22 are inputted, the control unit 24 obtains 3D positions of the respective feature points and converts the respective features into a reference distance to extract image patches corresponding to the reference distance, i.e., image patches converted into the reference image.

Also, the control unit 24 obtains 3D surface information with brightness values of the extracted image patches, performs an ICP algorithm to match the image patches converted into the reference image, and obtains a match value with the minimum error to build map information. The control unit may be a central processing unit (CPU).

The storage unit 26 is a memory to store data of the feature points extracted by the image processing unit 22, the image patches converted into the reference image by the control unit 24, and the map information built by the control unit 24. It is necessary for the storage unit 26 to store the current position and the final target position of the robot 10.

The drive unit 28 drives the robot 10, such that the robot 10 moves self-controllably along the path without the collision of walls or obstacles, based on the map information built by the control unit 24.

Hereinafter, a control method of the robot with the above-stated construction will be described.

Figure 3:
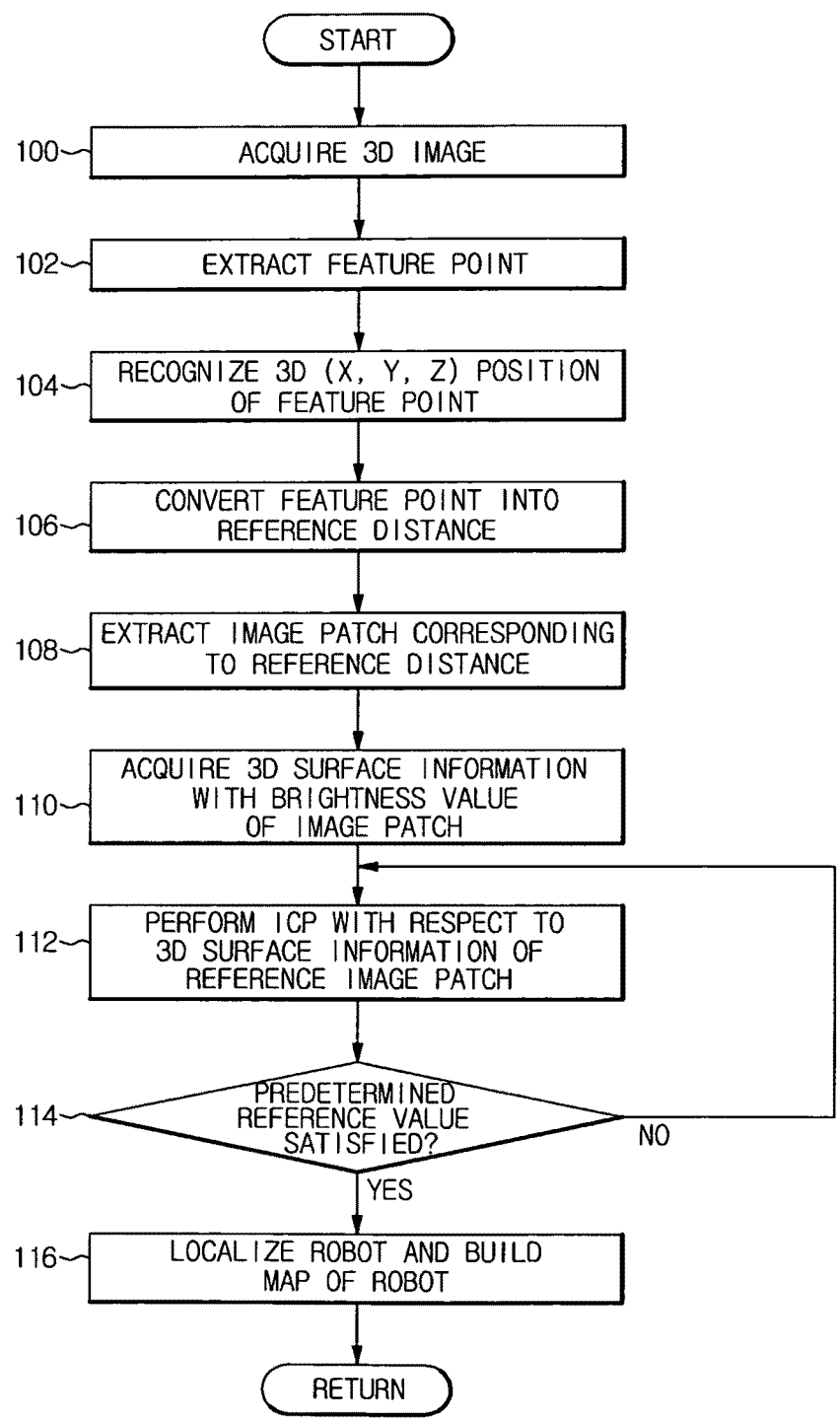
FIG. 3 is a flow chart illustrating a method of extracting and matching an image patch to localize a robot and build a map of the robot according to an embodiment of the present invention.

FIG. 3 is a flow chart illustrating a method of extracting and matching an image patch to localize a robot and build a map of the robot according to an embodiment of the present invention.

In FIG. 3, when the robot 10 starts to move in an unknown environment, an image on a movement path of the robot 10 is photographed by the image acquisition unit 20 to acquire an all-direction image including 3D information of various objects (for example, static objects or dynamic objects) located on the path in a mixed state (100).

Subsequently, the image processing unit 22 receives the 3D information of the all-direction image acquired by the image acquisition unit 20 and extracts feature points P of the movement path of the robot 10 (102). It is necessary for each feature point to exhibit a quantitative property in which the feature point is not changed depending upon time and a viewing angle when the point is selected in an environment where the robot 10 moves.

Subsequently, the control unit 18 receives the feature points P extracted by the image processing unit 22 and obtains 3D (X, Y, Z) coordinates of the feature points P and a plane including the feature points P through stereo image processing (104). Subsequently, as shown in FIG. 4, the control unit 18 converts the plane including the respective feature points P into a reference distance (106), and extracts and registers image patches corresponding to the reference distance, i.e., image patches of the reference image extracted in unit of a pixel having a predetermined size (108).

Figure 4:
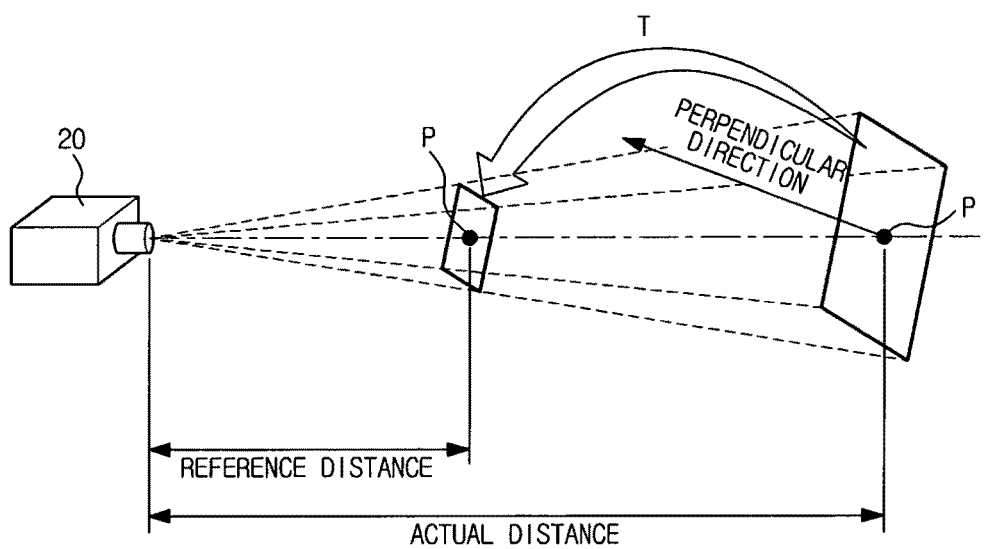
FIG. 4 is a perspective view illustrating an example of extracting a feature point from a reference image to localize a robot and build a map of the robot according to an embodiment of the present invention.

FIG. 4 is a prespective view illustrating an example of extracting a feature point from a reference image to localize a robot and build a map of the robot according to an embodiment of the present invention.

In FIG. 4, a perpendicular vector of an image patch of a plane including a feature point P at a reference distance is always directed to the image acquisition unit 20. It is possible to obtain an image conversion matrix T using an image corresponding to the reference distance and the position and direction of an actual image. Since an image patch from a regular distance is extracted by extracting an image patch corresponding to the reference distance using the image conversion matrix, it is possible to eliminate an error occurring from a 3D distance between the image acquisition unit 20 and the feature point P.

Referring back to FIG. 3, the control unit 24 obtains 3D surface information using the brightness values of the pixel-unit image patches converted into the reference image (110), and performs an ICP algorithm to match the image patches converted into the reference image, thereby matching the 3D surface information of the image patches converted into the reference image (112). The ICP algorithm is a general method of registering two surfaces in a repeated manner such that brightness values of the two surfaces becomes minimum. A method of performing the ICP algorithm is disclosed in several documents, such as Korean Patent Application Publication No. 2003-0040701 and No. 2004-0094230.

More specifically, the ICP algorithm used to match the 3D surface information is a general method of registering two surfaces. The ICP algorithm obtains a relationship between rotation and translation of rigid body motion in which the total distance sum of points existing on the two surfaces becomes minimum. There are several methods of embodying the ICP algorithm.

An ICP algorithm suggested by Horn solves the registration problem between two different coordinate systems using unit quaternions by a covariance matrix. [B. K. P. Horn, 'Closed-Form Solution of Absolute Orientation Using Unit Quaternions', Journal of the Optical Society of America, A, Vol. 4. pp. 629-642, April 1987]. On the other hand, an ICP algorithm suggested by Besl and McKay, which is a method widely used in connection with the registration problem, repeatedly finds pairs of the nearest points between two data sets, without the extraction of a point of agreement, to optimize the registration. [P. J. Besl and N. D. McKay, 'A method for Registration of 3-D shapes', IEEE Transactions on Pattern Analysis and Machine Intelligence, Vol. 14, no. 2, pp. 239-256, February 1992].

When matching the surface information of the 3D images using the ICP algorithm, there occurs an error if a predetermined reference value (a brightness value having a predetermined magnitude) is not satisfied. In this embodiment, therefore, 3D surface information satisfying the predetermined reference values are matched, whereby it is thought that this embodiment strongly deals with an error in localizing the robot 10 and building a map of the robot 10 in a general environment (an unknown environment).

Figure 5:
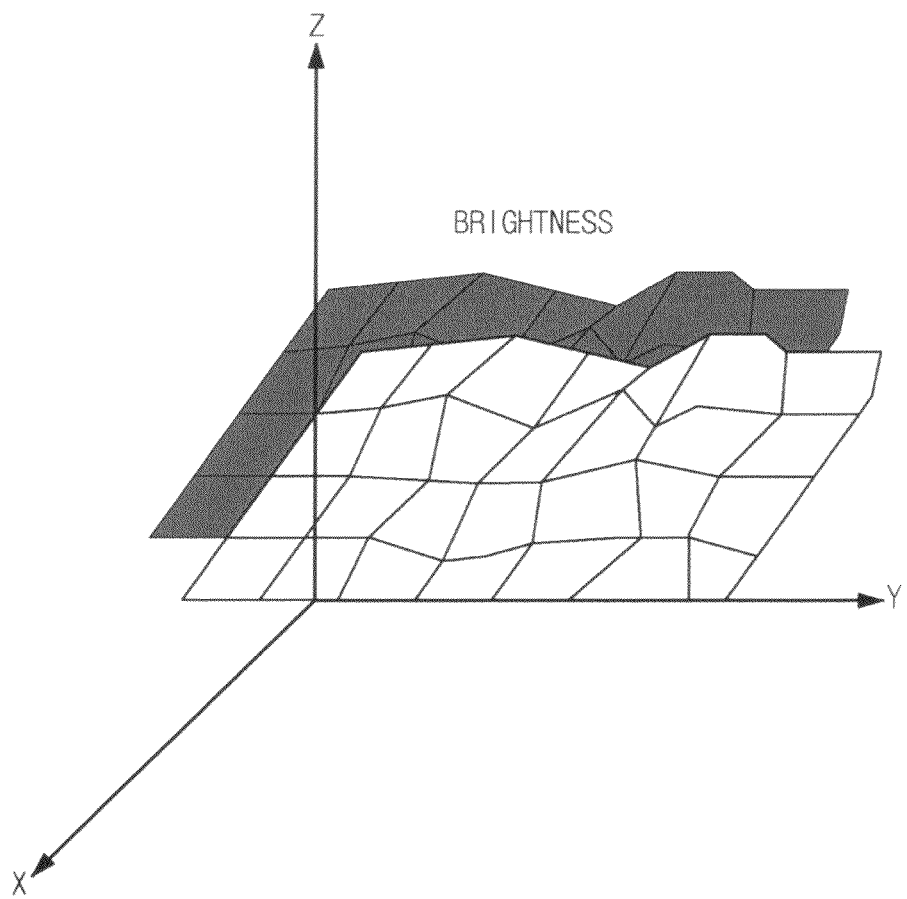
FIG. 5 is a view illustrating an example of an ICP algorithm to match two surfaces to build a map of a robot according to an embodiment of the present invention.

The surface information of the 3D image is matched as shown in FIG. 5 through the performance of the ICP algorithm. When the value of the brightness exceeds the predetermined magnitude, during the surface matching of the ICP algorithm, an error occurs, with the result that distorted map information may be included. Consequently, the control unit 24 calculates the brightness values of the 3D surface information matched by the ICP algorithm and determines whether the brightness values of the 3D surface information satisfies the predetermined reference value (114).

When it is determined at operation 114 that the brightness values of the 3D surface information satisfies the predetermined reference value, the control unit 24 matches the 3D surface information of which the brightness values satisfy the predetermined reference value and builds map information with the matched values at which the error is minimum, thereby performing the localization of the robot 10 with an improved performance of the SLAM (116).

In this embodiment, meanwhile, a mobile robot that moves self-controllably, such as a housework helping robot, a public service robot, or an intelligent humanoid robot, was described as an example of the robot 10, to which, however, the embodiments of the present invention are not limited. The embodiments of the present invention are applicable to various applications. For example, the robot may be loaded in a mobile phone or in a wearable form to recognize the current position and inform of an advancing direction. Alternatively, the robot may be loaded in a vehicle to guide the vehicle to reach the destination in an unmanned fashion or automatically park the vehicle.

As is apparent from the above description, the embodiments of the present invention are capable of extracting the image patch converted into the reference image using the position information of the robot and the 3D position information of the feature point, thereby eliminating an error occurring from the 3D distance between the camera and the feature point. Also, the embodiments of the present invention are capable of obtaining the 3D surface information with the brightness values of the image patches to obtain the match value with the minimum error by a 3D surface matching method of matching the 3D surface information of the image patches converted into the reference image through the ICP algorithm, thereby accurately localizing the robot and building the map of the robot.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method of a robot, comprising:
acquiring a 3D image of an environment where the robot moves;
extracting a feature point from the acquired 3D image and converting a plane including the extracted feature point into a reference image; and
extracting image patches from the reference image using a central processing unit (CPU) and matching the image patches by obtaining 3D surface information using brightness values of the image patches using the CPU,
wherein the reference image is an image corresponding to a reference distance.

2. The control method according to claim 1, wherein the converting the plane including the feature point into the reference image comprises converting the plane including the feature point into the reference distance to acquire the image corresponding to the reference distance.

3. The control method according to claim 2, wherein the extracting the image patches from the reference image comprises obtaining a conversion matrix with the reference image to extract predetermined pixel-unit image patches from the reference distance.

4. The control method according to claim 3, wherein the matching the image patches further comprises:
matching the 3D surface information three-dimensionally using an ICPiterative closest point ("ICP") algorithm.

5. The control method according to claim 4, further comprising determining whether brightness values of the 3D surface information satisfies a predetermined reference value, wherein, when it is determined that the brightness values of the 3D surface information satisfies the predetermined reference value, the 3D surface information is matched by the ICP algorithm.

6. A control method of a robot, comprising:
acquiring a 3D image of an environment where the robot moves;
extracting a feature point from the acquired 3D image and converting an image having the extracted feature point into an image corresponding to the reference distance;
extracting an image patch from the image corresponding to the reference distance using a central processing unit (CPU);
obtaining 3D surface information using a brightness value of the image patch; and matching the 3D surface information three-dimensionally using an iterative closest point ("ICP") algorithm executed by the CPU.

7. The control method according to claim 6, wherein the extracting the image patch of the image corresponding to the reference distance comprises obtaining a conversion matrix with the image corresponding to the reference distance and extracting predetermined pixel-unit image patches from the reference distance.

8. A robot comprising:
an image acquisition unit to acquire a 3D image of an environment where the robot moves; and
a control unit to extract a feature point from the acquired 3D image, to convert a plane including the feature point into a reference image, to extract image patches from the reference image by obtaining 3D surface information using brightness values of the image patches, and to match the image patches,
wherein the reference image is an image corresponding to a reference distance.

9. The robot according to claim 8, wherein the control unit converts the plane including the feature point into the reference distance, acquires the image corresponding to the reference distance, and converts the acquired image into the reference image.

10. The robot according to claim 9, wherein the control unit obtains a conversion matrix with the reference image to extract predetermined pixel-unit image patches from the reference distance.

11. The robot according to claim 10, wherein the control unit matches the 3D surface information three-dimensionally using an iterative closest point ("ICP") algorithm.

12. The robot according to claim 11, wherein the control unit determines whether the brightness values of the 3D surface information satisfies a predetermined reference value, and, when it is determined that the brightness values of the 3D surface information satisfies the predetermined reference value, matches the 3D surface information using the ICP algorithm.

13. A robot comprising:
an image acquisition unit to acquire a 3D image of an environment where the robot moves;
a control unit to extract a feature point from the acquired 3D image, to convert an image having the extracted feature point into an image corresponding to the reference distance, to extract an image patch from the image corresponding to the reference distance, to obtain 3D surface information using a brightness value of the image patch, and to match the 3D surface information three-dimensionally using an iterative closest point ("ICP") algorithm.

14. The robot according to claim 13, wherein the control unit extracts the image patch of the image corresponding to the reference distance by obtaining a conversion matrix with the image corresponding to the reference distance and extracting predetermined pixel-unit image patches from the reference distance.

\* \* \* \* \*

UNITED STATES PATENT AND TRADEMARK OFFICE
CERTIFICATE OF CORRECTION

PATENT NO. : 8,824,775 B2
APPLICATION NO. : 12/654160
DATED : September 2, 2014
INVENTOR(S) : Suk June Yoon et al.

Page 1 of 1

It is certified that error appears in the above-identified patent and that said Letters Patent is hereby corrected as shown below:

In the Claims

Column 6, Line 47, In Claim 4, delete "comprises:" and insert -- comprises --, therefor.

Column 6, Line 49, In Claim 4, delete "ICPiterative" and insert -- iterative --, therefor.

Signed and Sealed this
Twenty-third Day of December, 2014

Michelle K. Lee
*Deputy Director of the United States Patent and Trademark Office*